June 6, 1939.  A. C. HITZEMAN  2,161,046
PARKING METER
Filed March 27, 1936  3 Sheets-Sheet 1
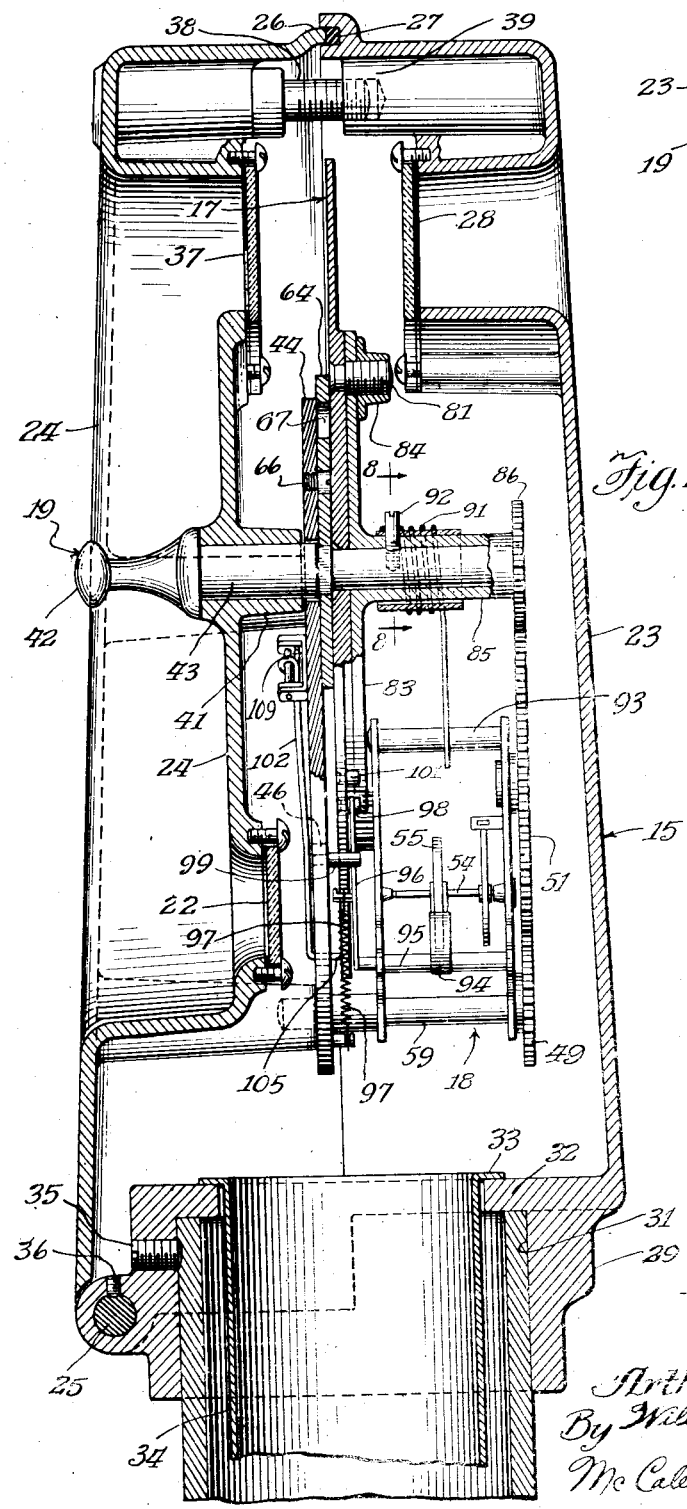
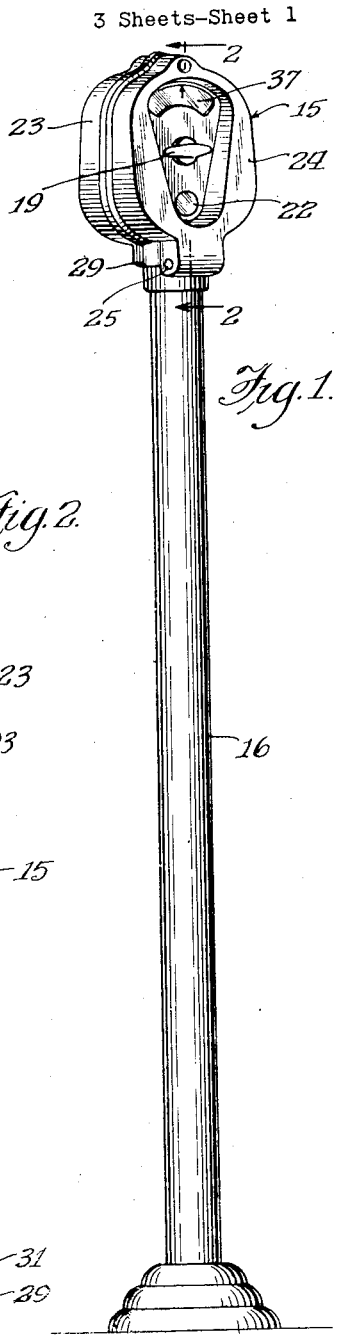
Fig. 1.
Fig. 2.
Inventor:
Arthur C. Hitzeman
By Williams, Bradbury,
McCaleb & Hinkle Attys.

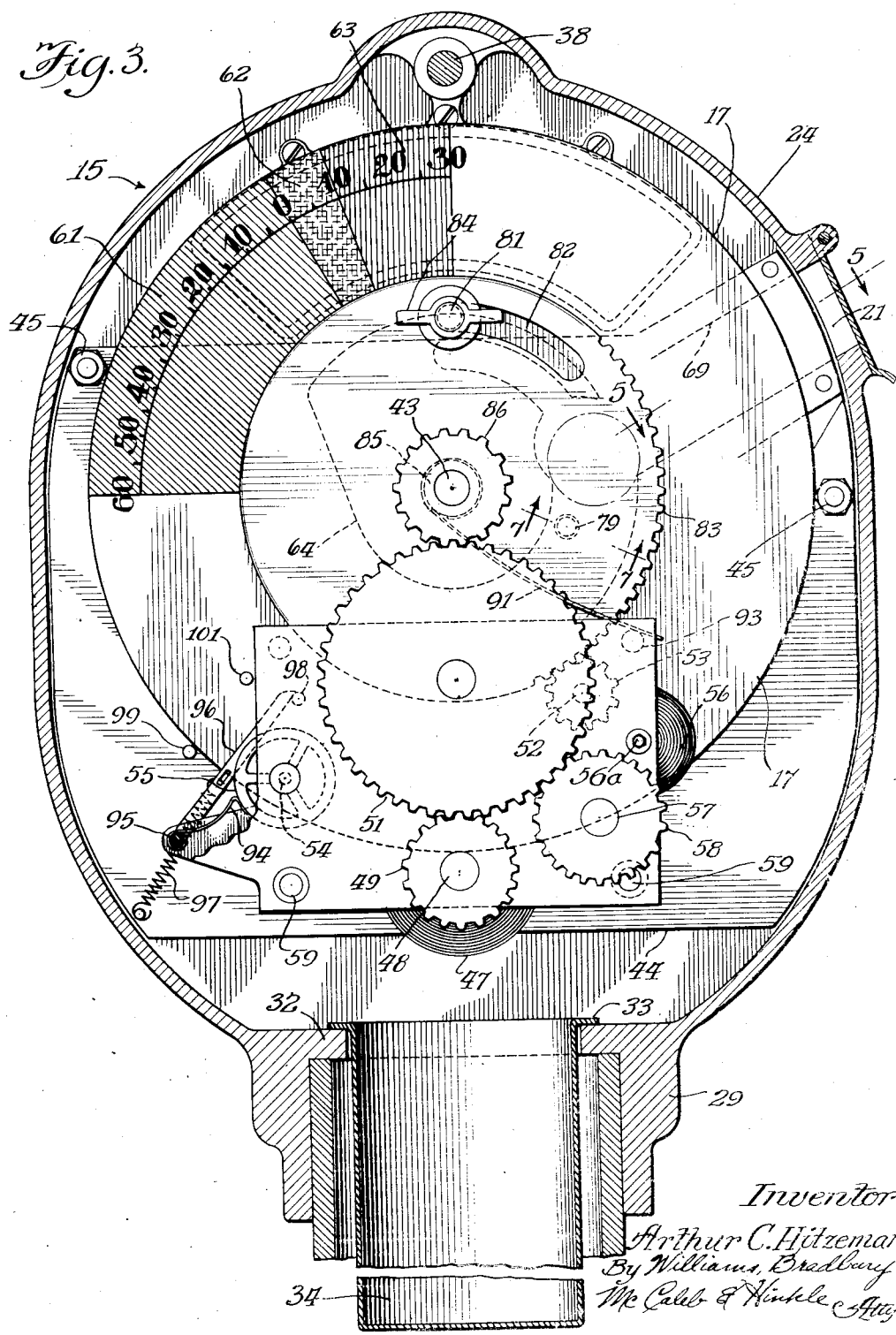

June 6, 1939. A. C. HITZEMAN 2,161,046
PARKING METER
Filed March 27, 1936 3 Sheets-Sheet 3
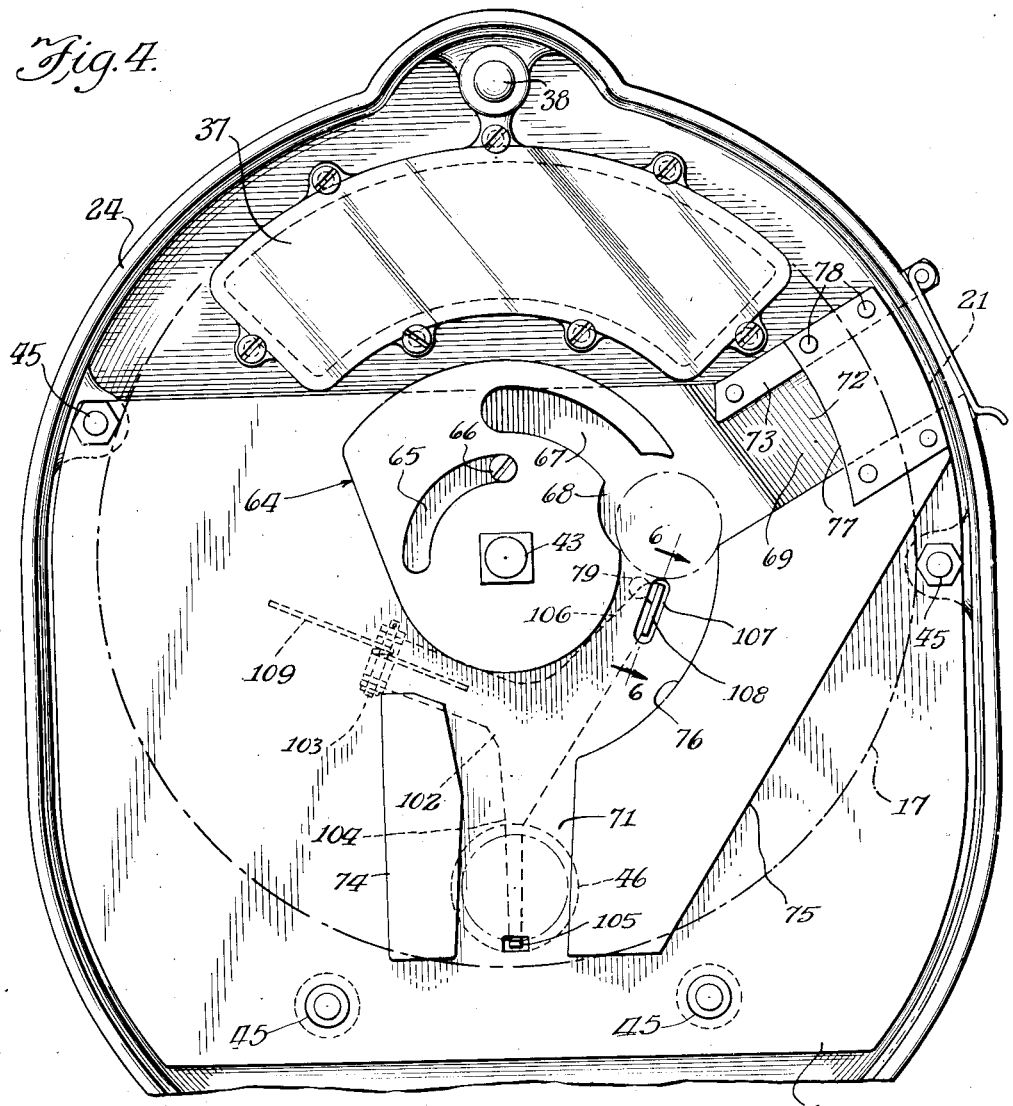
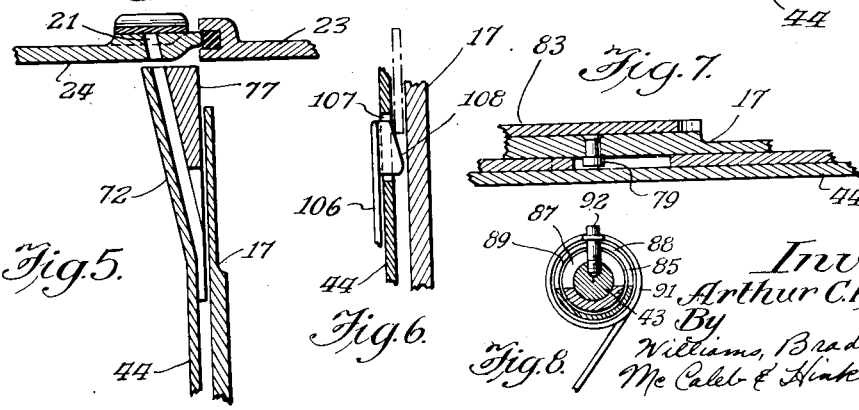
Inventor:
Arthur C. Hitzeman
By Williams, Bradbury,
McCaleb & Hinkle. Attys.

Patented June 6, 1939

2,161,046

UNITED STATES PATENT OFFICE 2,161,046

PARKING METER

Arthur C. Hitzeman, Roselle, Ill., assignor to David C. Rockola, Chicago, Ill.

Application March 27, 1936, Serial No. 71,118

9 Claims. (Cl. 194—83)

This invention relates to parking meters.

The parking of vehicles on streets or in other places is frequently, if not quite generally, limited by ordinances or other controlling regulations to periods of time which may depend upon desired or prevailing traffic conditions. On some streets, for example, one-hour parking is permissible, and on others the parking period may be more or less than an hour. One purpose of such regulations is to permit a greater number of parkings per day in a given district or area or in the available parking spaces. The parking meter of the invention is adapted to indicate the availability of a parking space for an automobile or other vehicle; upon actuation, to set, energize, and start timing means for indicating the permissible time interval or period of parking and, during the parking period, for indicating the time remaining in the parking period; and to indicate when the parking period has expired. In that manner the invention may be employed to facilitate enforcement of parking regulations.

A primary object of the invention is the provision of a novel parking meter.

Important objects of the invention include the provision of such a parking meter of simple and fool-proof construction, which may be readily installed and operated to indicate and time a desired parking period and which is adjustable to adjust the timed parking period; the provision in such a parking meter of manually operable means for moving indicating means to a starting position, and timing means for driving the indicating means toward a time-up or zero position; the provision of starting and stopping means for the timing means, operable from the indicating means in predetermined positions; the provision of a coin or token controlled parking meter; the provision of a parking meter which indicates a parking period, a grace period, and an overtime period; the provision of a parking meter which, if desired, produces an audible signal when the parking period expires; the provision of a parking meter in which the indicating means is moved to a parking period indicating position and the timing means is energized and started by the manually operable means; and the provision of a coin or token controlled parking meter whereby the inserted coin or token serves as a driving connection between the manually operable means and the means driven thereby and is thereafter held in a visible position until the next coin or token is inserted.

Other objects of the invention include the combinations and arrangements of parts as hereinafter described in connection with the accompanying drawings and as more particularly set forth in the claims.

In the drawings:

Fig. 1 is a perspective view of a parking meter embodying the features of the invention;

Fig. 2 is a fragmentary cross-section taken substantially along the lines 2—2 of Fig. 1, but on a different scale from that of Fig. 1.

Fig. 3 is a cross-section through the casing shown in Fig. 2, showing a rear view of the meter apparatus in a stop position;

Fig. 4 is a fragmentary rear view of the front casing member with some of the apparatus removed to bring out certain details of the token or coin control apparatus;

Fig. 5 is a fragmentary cross-section taken substantially along the lines 5—5 of Fig. 3;

Fig. 6 is a fragmentary cross-section taken substantially along the lines 6—6 of Fig. 4;

Fig. 7 is a fragmentary cross-section taken substantially along the lines 7—7 of Fig. 3; and Fig. 8 is a detail cross-section taken substantially along the lines 8—8 of Fig. 2.

Illustrative of the invention, the novel parking meter comprises a casing 15 of any suitable construction, which may be fixed on a supporting standard 16 of convenient height, and, in the casing, indicating means 17 visible from opposite sides of the casing, timing means 18, and manually operable means 19 which, when a token or coin is inserted in a casing slot or aperture 21, is adapted to set the indicating means at a starting position and to energize the timing means 18 for driving the indicating means 17 in a time indicating direction. The manually operable means then delivers the deposited token or coin to a position where it is visible through a sight window 22 in the casing 15, the token or coin being retained in that position until the next operation of the parking meter for the purpose of discouraging the use of counterfeit or spurious tokens or coins in the meter.

The casing 15 may be cast or otherwise formed and, as illustrated, may comprise a rear, relatively stationary, dished member 23 having pivotally secured thereto a front, swingable, dished member 24 by, for example, a pintle hinge 25 located at corresponding ends of the dished members. Preferably, the meeting edges of the members 23 and 24 are formed to provide a tongue-and-groove joint or connection 26 associated with suitable weather stripping or other gasket means 27 for protecting the apparatus in the casing from the weather.

The rear casing member 23 is provided at its upper end with a sight window 28 for exposing the indicating means 17 to view from the rear side of the casing, and at its lower end the casing member 23 is provided with a depending boss 29 having an aperture 31 therein and an internal flange 32 at the upper end of the boss 29. That aperture 31 is adapted to receive therein the upper end of the standard 16, which is preferably of hollow construction, as shown in Figs. 2 and 3.

The flange 32 provides at one side thereof an abutting shoulder for the upper end of the standard 16 and, at the other side thereof, the flange provides a supporting surface or shoulder for an external flange 33 of a token or coin receptacle 34 open at its upper end and removably receivable in the hollow standard 16 through the aperture 31. The casing member 23 may be secured on the standard 16 by any suitable means, such as a retaining screw 35 passing through the boss 29 at the open side of the casing member 23 and engaging the standard 16 therein.

As already stated, the front casing member 24 is pivoted to the casing member 23 by the pintle hinge 25, which is preferably located below the retaining screw 35. In such a construction the casing retaining screw 35 and a pintle retaining screw 36 are accessible only when the casing 15 is open. Yet, when the casing is open, it is readily removable as a unit from the standard, or the front casing member 24 is readily removable. Such a construction facilitates replacement of the entire casing or of the front casing member 24 and the apparatus carried thereby.

If desired, the front wall of the casing 15 may be recessed above the hinge 25 and the sight window 22 may be located near the lower end of that recess. A sight window 37 aligned with the sight window 28 may be provided in that front wall recess of the casing 15 to expose the indicating means 17 to view from the front of the casing. A key operable, threaded bolt 38 at the upper end of the front casing member 24 and an internally threaded socket 39 in the rear casing member 23 constitute suitable locking means for the casing.

Formed in the front casing member 24 between the sight windows 22 and 37 is a boss 41, which is apertured to provide a bearing for the manually operable means 19 which comprises a handle 42 outside the casing 15 and a shank 43 operatively connected to the handle and extending into the casing through the aperture in the boss 41 and an aperture in a mounting plate or panel 44. That plate 44 is suitably secured as at 45 in the front casing member 24 below the level of the sight window 37 and adjacent the inner end of the boss 41, and the plate is provided with an aperture 46 aligned with the sight window 22.

As already mentioned, the casing 15 contains the indicating means 17 and the operating and control means therefor, including the timing means 18. It will be understood that the timing means may be any suitable clock apparatus, that shown being merely for illustrative purposes. It it not, therefore, described in detail, but by way of explanation it might be well to point out that, as illustrated in Figs. 2 and 3, the clock apparatus 18 comprises a main spring 47, a winding stem 48 therefor, having a gear 49 fixed thereon and meshing with a gear 51 rotatably fixed on the clock casing for winding the spring 47, a timing shaft 52 driven from the main spring 47 and having a pinion gear 53 fixed thereon to rotate therewith, and an escapement shaft 54 provided with a balance wheel 55 for controlling the driving of the timing shaft 52 from the spring 47. If desired the clock 18 may be of the well known alarm type for producing a signal at the end of the parking period. Accordingly the clock may include a signal operating spring 56, a winding stem 56a, and a shaft 57 carrying a gear 58 fixed thereon and meshing with the gear 51 for correlating the operation of the spring 56 with the indicating means 17 in a well known manner. Such a clock may be mounted by any suitable means 59 on the mounting plate 44.

The clock 18 is adapted to drive the indicating means 17 comprising a parking period indicator 61, a grace period indicator 62, and an overtime indicator 63. Such indicating means may be provided in the form of a disc or dial having portions thereof of different colors or otherwise marked to indicate at both sides of the disc the parking, grace, and overtime periods, respectively. Each such portion is calibrated in minutes or other time units. The indicating disc is adapted to be loosely carried on the shank 43 and extends therefrom to a position between the sight windows 28 and 37 so that the time calibrations on the disc are visible through the sight windows from opposite sides of the casing.

Fixed on, to rotate with, the shank 43 between the mounting plate 44 and the indicating disc 17, is a token or coin transferring device 64 of generally circular and plate-like configuration and having an arcuate slot or aperture 65 cooperating with a pin or other projection 66 on the inner face of the mounting plate 44 for limiting the rotation of the manually operable means 19 and the device 64 in both directions. That transferring device 64 also has an arcuate slot or aperture 67 which communicates at one end with a circular slot or recess 68 which is provided in the periphery of the transferring device for receiving tokens or coins inserted in the aperture 21 and transferring them to a position over the receptacle 34.

The mounting plate 44 and the indicating disc 17 cooperate to provide therebetween an interrupted token or coin guideway including a receiving guideway portion 69 communicating at its outer end with the casing aperture 21, and a depositing guideway portion 71 extending across the aperture 46 and toward the open end of the receptacle 34. The aperture 65 and pin 66 permit rocking the handle 42 and the transferring device 64 between a position at which the slot 68 is aligned with the inner end of the receiving guideway portion and a position at which the slot 68 is aligned with the inner end of the depositing guideway portion.

Such a token or coin guideway may be provided, where the casing aperture 21 is in the front casing member, by bending or otherwise forming a portion 72 of the mounting plate 44 forwardly at such an inclination that a token or coin inserted in the aperture 21 will gravitate along the portion 72 between the mounting plate and the indicating disc. Guide members 73 and 74 extending from the mounting plate to adjacent the indicating disc provide one guide wall each for the receiving and depositing guideway portions 69 and 71, respectively, the other wall for each of the guideway portions 69 and 71 being provided by a guide member 75 having an arcuate guide wall 76 extending between the guideway portions 69 and 71 for retaining a token or coin in the slot 68 while the transferring device 64 is being rotated to transfer the token or coin to the depositing guideway portion 71. If desired the receiving guideway portion 69 may be provided with a plate 77 bridging the upper end of the guideway and secured as at 78 to the guide members 73 and 75.

With such a construction the inserted token or coin may be employed as driving means for moving the indicating disc 17 to a starting position for indicating the duration of the parking period. To that end a pin or other projection 79 is provided on the disc 17 and extends into the space between the guide wall 76 and the periphery of the transferring device 64 at such a position that when the transferring device is rotated in a transferring direction without a token or coin being in the slot 68, the slot 67 passes about the pin 79 without driving the indicating disc 17. When a token or coin has been inserted through the aperture 21 into the slot 68, the inserted token or coin rotates with the transferring device 64 and engages the pin 79 to move the indicating disc 17 to its starting position, whereupon the token or coin then drops into the depositing guideway portion 71.

In thus transferring the inserted token or coin to the depositing guideway portion 71, the indicating disc 17 is rotated to a starting position to indicate the beginning of the parking period. That movement of the disc is employed to energize the timing means 18 which is thereupon adapted to drive the disc in the opposite direction to time and indicate the duration of the parking period. For that purpose the disc 17 is provided with a threaded pin or projection 81 extending rearwardly from the disc through an arcuate aperture 82 of a segmental gear 83 on the shank 43 rearwardly adjacent the disc 17. A wing nut or other operable means 84 may be threaded on the pin 81 for adjustably securing the gear 83 to the rear face of the disc 17.

That segmental gear meshes with the gear 53 on the timing shaft 52 of the clock 18 and is provided with a rearwardly extending sleeve portion 85 loose on the shank 43 and having at its inner end a pinion gear 86 meshing with the gear 51. Thus in turning the manually operable means 19 to transfer a token or coin to the depositing guideway portion 71, the rotation of the indicating disc 17 is transmitted to the segmental gear 83 through the pin 81 and nut 84 and through the sleeve portion 85 to the pinion gear 86.

Such rotation of the pinion gear 86 drives the gear 51 to wind the main spring 47 and, if desired, the signal operating spring 56. By loosening the nut 84 and adjusting the indicating disc about the shank 43 relative to the segmental gear, the pin 79 may be moved nearer or further from the token or coin receiving slot 68 so that the full stroke or any part thereof of the token or coin being transferred from the receiving to the depositing guideway portion can be utilized to rotate the indicating disc toward starting position. Thus the starting position of the indicating disc and hence the duration of the parking period can be varied as desired, and the timing gear 53 meshing with the segmental gear 83 will drive that gear and hence the indicating disc 17 in a timing direction.

For returning the manually operable means 19 to its initial position, an aperture 87 is cut in the sleeve portion 85 and extends thereabout for approximately 180°. A sleeve 88 is loosely fitted on the sleeve portion 85 and is provided with an aperture 89 in about 180° of its periphery for carrying a torsion spring 91 having an end anchored to a screw or other projection 92 on the shank 43 and extending radially outwardly therefrom through the apertures 87 and 89. The other end of the spring 91 may engage some fixed member 93 of, for example, the timing means 18. The apertures 87 and 89 are of such lengths that whether or not a token or coin is inserted in the parking meter, the spring 91 can move the screw 92 through an arc sufficient to return the manually operable means to its initial position without the screw 92 engaging the ends of the apertures.

To promote accuracy in the timing operation, it is important to provide means for assuring the starting and stopping of the clock 18. To that end a resilient shoe or controller 94 is, as shown best in Fig. 3, fixed at one end to a rockable stud 95 journaled in the clock casing and extends to a position of engagement with the balance wheel 55 of the escapement device when the parking meter is not in use. The stud 95 carries an arm 96 rockable therewith and extending to a position rearwardly adjacent the indicating disc 17. A spring 97 yieldably holds the arm 96 in a position against a pin 98 on the indicating disc 17 to cause the shoe 94 to engage the balance wheel 55.

When the disc 17 is rotated toward a starting position as already described, the pin 98 rotates the arm 96 and hence the stud 95 and shoe 94 in a direction to cause the resilient shoe 94 to rotate the balance wheel 55 to start the clock. As the indicating disc continues to be rotated toward a starting position, the arm 96 is moved beyond a "dead center" position by the pin 98 so that the spring 97 pulls the arm 96 against a stop pin 99 projecting rearwardly from the mounting plate 44. In that position the outer end of the arm 96 is out of the path of the pin 98, where it remains until it is engaged by a pin 101 projecting rearwardly from the indicating disc 17 as the clock-driven indicating disc 17 approaches the end of its travel in the opposite direction. The pin 101 engages the arm 96 and moves it beyond the "dead center" position toward a clock stopping position as the indicating means 17 indicates the end of the measured period of time, whereupon the spring 97 pulls the arm 96 against the pin 98 causing the shoe 94 to engage the balance wheel 55 and stop the clock.

In order to discourage the use of counterfeit or spurious tokens or coins, a spring held member 102 is pivoted as at 103 on the front face of the mounting plate 44 and is provided with a token or coin holding arm 104 extending to a position adjacent the aperture 46 and there provided with an inwardly extending token or coin supporting tab or finger 105. That member 102 is provided with another arm 106 extending to adjacent an aperture 107 in the mounting plate 44 between the guide wall 76 and the transferring device 64, and there provided with an operating cam 108 extending through the aperture 107 in the path of a token or coin being transferred from the receiving to the depositing guideway portion. A spring 109 yieldably holds the member 102 in such position that the supporting finger 105 holds an inserted token or coin in a position visible through the aligned sight window 22 and aperture 46 until another token or coin in being transferred to the depositing guideway portion engages the cam 108 and operates the member 102 in a direction to release the held token or coin which then falls through the depositing guideway portion into the receptacle 34. When the second mentioned token or coin is moved beyond the cam 108, the spring returns the supporting finger 105 to its position to interrupt the token or coin in its travel toward the receptacle 34 and to hold that token or coin in the visible position until a subsequent operation of the novel parking meter.

The novel parking meter may be installed adjacent a parking space, for example, at the curbing of a street or public highway. In using it, when the driver of the vehicle parks in that space, he inserts a token or coin in the aperture 21 and turns the handle 42. The inserted token or coin in being transferred toward the depositing guideway portion 71 by the transferring device 64 engages the pin 79 to rotate the indicating disc 17 toward a starting position and engages the cam 100 to operate the member 102, causing the previously inserted token or coin to be released into the receptacle 34.

In thus rotating the indicating disc 17 toward its starting position, the disc drives the segmental gear 83 toward its starting position with reference to the pinion time gear 53 and drives the pinion gear 86 to drive the clock winding gear 51 whereby to energize the clock. While the disc 17 and the clock 18 are thus being set, the pin 98 on the rotating disc 17 moves the arm 95 toward the stop pin 99 causing the shoe 94 to spin the balance wheel 55 and thus start the clock 18.

When the rotation of the handle 42 in thus setting the meter is stopped by the limiting slot 65 and pin 66, the spring 91 returns the handle to its initial position. The clock 18 now drives the segmental gear 83 through the pinion gear 53 to rotate the indicating disc 17 whereby to time and to indicate the duration of the parking period and thereafter the duration of the grace period and the overtime through the rear sight window 28 and the front sight window 37. At the end of the entire period indicated, the pin 101 actuates the arm 96 to move the shoe 94 against the balance wheel 55 whereby to stop the clock.

While I have illustrated and described a preferred embodiment of my invention, many modifications may be made without departing from the spirit of the invention, and I do not wish to be limited to the precise details set forth but desire to avail myself of all changes within the scope of the appended claims.

Having thus described my invention, what I claim as new and desire to secure by Letters Patent of the United States is:

1. A parking meter comprising a casing having a pair of aligned sight windows in opposite walls thereof, a rotatable indicator disc in said casing and having time indicia on its opposite faces which is visible from opposite sides of said casing through said aligned sight windows, timer means in said casing having means for driving said indicator disc in one direction in accordance with the time indicia on the opposite faces thereof, means for starting and stopping said timer means, token or coin receiving and transferring means in said casing, means associated with the indicator disc and movable by a token or coin during its transfer by the last said means for rotating said indicator disc to a starting position in the opposite direction from that caused by said timer means, means operable by said indicator disc during said movement to starting position for energizing said timer, means for adjusting the energizing means relative to said disc whereby to vary the starting position of said disc, means comprising a member on said indicator disc for operating said starting means when said indicator disc is moved to a starting position, and means comprising a member on said disc for effecting stopping of said timer means when said indicator disc is driven by said timer means from the starting position.

2. In a parking meter comprising a casing having a relatively movable front wall portion and a sight window therein, an oscillatable indicator disc mounted within said casing for movement in the plane of said front wall portion and adjacent the inner side of said sight window so as to cover said window, means for moving said indicator disc in opposite directions relatively to said window comprising token controlled manually operable means for moving said indicator disc in one direction to a starting position, and timer means energized by said indicator when so moved to starting position, means associated with said timer means and indicator for driving said indicator in the other direction over said window, and means operable by said indicator when it is moved to a starting position for initiating starting operation of said timer means.

3. In a parking meter for indicating and timing a parking period, the combination of a manually operable control member, a movable indicator adjustable relatively of said control member and adapted to be actuated thereby for setting the indicator at a starting position on each actuation of said control member, means for so adjusting said indicator, a clock, and means driven in one direction by said indicator when actuated by said control member to wind said clock and thereafter in the opposite direction from said clock to drive said indicator.

4. In a token or coin controlled parking meter for indicating and timing a parking period, the combination of a clock, an indicator adapted to be driven from said clock, a token or coin moving member adjacent one side of said indicator, said indicator having a token or coin operable member engageable by a token or coin being moved by said moving member for setting said indicator in a starting position, means for adjusting said indicator for varying the distance through which the indicator is moved whereby to vary the starting position thereof, means rotatable with the indicator for winding said clock, and means driven by said clock for driving the last said means whereby to drive said indicator.

5. In a parking meter for indicating and timing a parking period, the combination of a manually operable control member, a movable indicator adjustable relatively of said control member and adapted to be actuated thereby for setting the indicator at a starting position on each actuation of said control member, means for so adjusting said indicator, a clock, said clock including an alarm mechanism, means driven in one direction by said indicator when actuated by said control member to wind said clock and thereafter in the opposite direction from said clock to drive said indicator, and means driven by the clock winding means for energizing said alarm mechanism for setting said mechanism during the operation of said manually operable control member to set said indicator.

6. A coin controlled parking meter comprising a casing, an operating shaft extending therefrom for manual actuation, a coin transfer member operable by said shaft, a movable parking period indicator mounted for movement relative to said transfer member and movable to and from a parking period starting position on each operation of said transfer member, a timer for actuating said indicator from said position, means cooperating with said transfer member during the transfer of a coin thereby for moving said indicator to starting position, said transfer member assuming its original position after actuation thereof, and means operable by said indicator during such movement of the same to the starting position for energizing said timer.

7. A coin controlled parking meter comprising a parking period indicator, timing means for moving said indicator from a parking period starting position, a manually operable coin transfer mechanism mounted for movement relative to said indicator and arranged to cooperate with said indicator during each transfer of a coin for moving said indicator back to a parking period starting position, said transfer mechanism assuming its original position after actuation thereof, means actuable by said indicator during said last mentioned movement for energizing said timer, and adjustable means for effecting variations in the starting positions of said indicator for varying the parking period indicated thereby.

8. A parking meter comprising a timing mechanism, a parking period indicator, means operatively connecting said mechanism and indicator whereby movement of said indicator to initial parking period position effects energization of said mechanism, passage forming means for coins, a manually operable coin transferring member for controlling the movement of coins through said passage, and a member carried by said indicator and projecting into said passage for engagement by a coin during the transfer movement thereof for moving said indicator to initial indicating position and energizing said mechanism.

9. A parking meter comprising timing mechanism, a parking period indicator, means operatively connecting said mechanism and indicator whereby the latter is driven by the former during a parking period and movement of the indicator to initial parking period indicating position effects the reenergization of said mechanism, a coin passage having an arcuate portion, means comprising a manually operable member for transferring coins through said passage, and a member carried by said indicator and projecting into said arcuate portion of said passage for actuation therein by a coin during the transfer movement thereof for moving the indicator to initial parking period position.

ARTHUR C. HITZEMAN.